Feb. 21, 1967  E. PLUMAT  3,305,339
PROCESS AND APPARATUS FOR THE MANUFACTURE OF
FLAT GLASS ON A MOLTEN METAL BATH
Filed Sept. 6, 1963
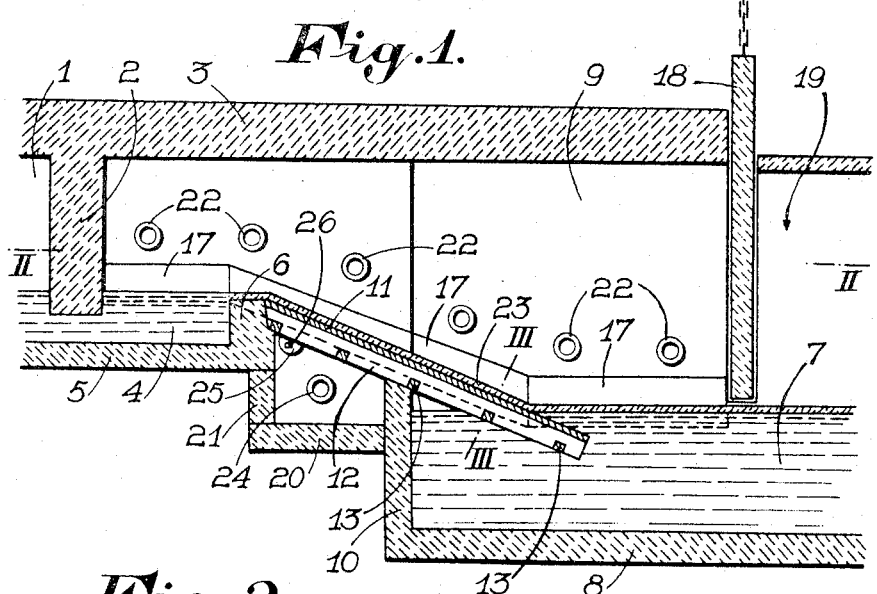
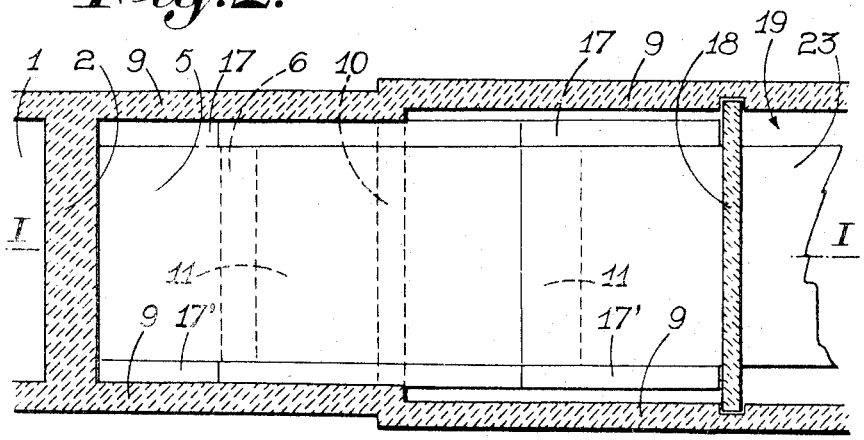
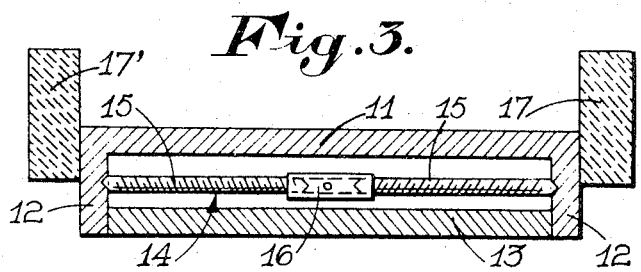
INVENTOR
EMILE PLUMAT
BY Corey, Hart & Stemple
ATTORNEYS United States Patent Office 3,305,339
Patented Feb. 21, 1967

3,305,339
PROCESS AND APPARATUS FOR THE MANUFACTURE OF FLAT GLASS ON A MOLTEN METAL BATH
Emile Plumat, Gilly, Belgium, assignor to Glaverbel, Brussels, Belgium, a Belgian company
Filed Sept. 6, 1963, Ser. No. 307,224
Claims priority, application Luxemburg, Sept. 29, 1962, 42,441
10 Claims. (Cl. 65—99)

The present invention relates to a process for the manufacture of flat glass in the form of a continuous ribbon on a molten metal bath, and also to an arrangement for carrying this process into effect.

In order to avoid the formation of a glass sheet by constriction of the paste between the rollers, it is known to manufacture flat glass by allowing the molten glass originating from a melting furnace, to flow over a weir on to the surface of a molten metal bath. Normally, the mass of fluid glass is allowed to become spread freely over the bath, while a tractive force is exerted on this spread mass with a view to causing the thinning of this vitreous paste. Unfortunately, the traction exerted by means of that part of the sheet which is already more or less rigid on the still fluid mass is not regular over the entire width of the sheet and certain discontinuities appear in the entrainment of the streams of paste. Certain precautions, such as for example a reheating of the glass after this first entrainment, permits a certain degree of homogenisation of the paste of the sheet, but since this reheating is limited in order to maintain the continuity of the sheet, this homogeneity is not perfect and certain internal defects in the paste give a deformation of the images seen through the windows which are obtained. This defect arises to some degree from the necessity of drawing a rigid sheet out of a necessarily fluid mass in order to maintain a certain possibility of spreading.

It is thus seen that the processes comprising overflow over a weir or spout are the cause of internal defects in the paste, these defects being due to a viscous mass being formed into a non-homogeneous sheet.

On the other hand, no special precaution is taken at the time of the passage of the glass on the spout or overflow, in view of the fact that this glass will still be partially fluidified later. This partial fusion assures a good surface of the glass sheet, but is not sufficient to correct the lack of homogeneity of the paste due to the cooling of the glass mass in contact with the overflow, while the glass in contact with the atmosphere is generally kept at high temperature.

The present invention enables these defects to be obviated and has other advantages which will become better apparent from the following description.

In the process for the manufacture of flat glass on a molten metal bath according to the invention, a layer of glass is formed by causing the glass coming from a melting furnace to flow with a substantially constant level over a spout or overflow and to cause this layer to slide along an inclined plane which dips into the molten metal bath so that the glass layer remains supported throughout its travel. The glass layer thus does not experience any free fall between the overflow and the molten metal bath, nor any check at the instant of reaching the molten metal bath. The result is a homogeneous vitreous mass in which the glass streams remain parallel, free from heterogeneities arising from lateral movements of the glass or respreading of checked glass at the instant when it floats on the molten metal bath.

An arrangement for carrying this process into effect comprises an inclined plane which is preferably self-supporting and which bears at one end against the overflow and at the other end on the wall of the molten metal bath and extends into this latter. It is advantageously made of a heat-resistant metal which is neutral with respect to the glass, such as molybdenum or tungsten, or a heat-resistant metal which is covered with a sheet of platinum.

The inclined plane is provided with longitudinal projections which are interconnected by transverse rods disposed close to the lower edges of the projections. It comprises extension means such as jacks which are disposed between the projections and are capable of placing the inclined plane under transverse traction. This latter prevents the formation of the transverse dip in the inclined plane, the consequence of which would be to displace the glass towards the mean axis of the inclined plane and to increase the thickness of the layer along this plane, to the detriment of the part thereof disposed near the edges.

In order to prevent an undesirable cooling of the glass during its travel along the inclined plane, the latter advantageously comprises heating means which keep its temperature approximately at the temperature of the glass, with the effect of preventing, in the glass layer, the formation of temperature gradients which would produce a non-homogeneous flow of the glass. These heating means are preferably electrical means acting by Joule effects.

The inclined plane is defined laterally by longitudinal walls which advantageously start upstream of the spout or overflow and end in an immersed position in the molten metal bath. The overflow and the inclined plane are enclosed in a chamber comprising upstream a screen or baffle which extends downwardly at the outlet of the melting tank into the mass of molten glass and downstream a movable baffle which can be lowered towards the glass ribbon floating on the molten metal bath. This chamber is provided with heating means, such as burners, capable of acting on the molten glass upstream of the overflow, and also on the layer of glass formed on the overflow, advancing on the inclined plane and floating on the molten metal bath.

The inclined plane may comprise at its upper end lifting means such as jacks, cams or eccentrics, with the object of adapting it to the overflow level when this level is capable of being modified.

Several embodiments of the arrangement according to the invention are shown by way of example in the accompanying drawing.

FIG. 1 is a longitudinal section of the arrangement according to the invention, on the line I—I of FIGURE 2;

FIG. 2 is a plan view of the part which is below the line II—II of FIGURE 1, and FIG. 3 is a section on the line III—III of FIGURE 1, to a larger scale.

The arrangement according to the invention is contiguous with a furnace 1 for melting the glass, of which only the last part comprising a baffle 2 extending downwardly from the arch 3 and into the molten glass 4 is shown in the figures. A short glass discharge channel 5 ends in an overflow 6. The arrangement also comprises a molten metal bath 7 contained in a tank defined by a base 8, longitudinal walls 9, a lateral wall 10 and also by a lateral wall which is disposed at that end of the molten metal bath which is not shown.

The overflow 6 and the molten metal bath 7 are connected by an inclined plane 11 which is self-supporting, the said plane bearing against the overflow 6 and resting on the wall 10, the said plane ending in the molten metal bath into which it extends. This inclined plane consists of a metal which is heat-resistant and neutral with respect to the molten glass. Particularly suitable for this purpose are metals having a high melting point, such as molybdenum or tungsten. However, it is also possible to use other heat-refractory metals by covering them with a sheet of noble metal such as platinum, if these metals are not neutral with respect to the molten glass.

The inclined plane comprises two longitudinal projections 12 which are supported relatively to one another by transverse bars 13. Opposite these bars, the inclined plane comprises extension means such as jacks 14 (FIG. 3) which are formed by rods 15 having opposite screw threads which are connected in a double-threaded nut 16, the rods bearing against the projections 12 in order to place the inclined plane under transverse traction.

The inclined plane is limited laterally by longitudinal walls 17 and 17′ which extend at different levels from the channel 5 to the molten metal bath 7, into which they extend. These walls impart a constant width to the layer of glass during its travel from the channel to the molten metal bath and contribute to the absence of disturbance in the glass layer, the different streams of the layer being compelled to advance along straight and parallel lines.

The channel, the overflow, the inclined plane and the first portion of the molten metal bath are enclosed in a chamber formed by the longitudinal walls 9, the arch 3, the baffle 2 and a movable baffle 18 separating this chamber from the zone 19 in which the glass undergoes the thermal treatment which is provided. Between the overflow 6 and the wall 10 of the molten metal bath, the space is closed downwardly by walls 20 and 21. The chamber comprises burners 22 (FIG. 1) which maintain the temperature of the glass layer 23. Burners 24 can also be provided beneath the inclined plane 11 in order to prevent cooling of the glass by the material of the said plane. However, it is preferable to heat the inclined plane by an electrical heating means; for example, by the Joule effect produced in the material of the plane by electrodes inserted between the projections 12 and the guiding walls 17 and 17′.

The overflow 6 shown in FIGS. 1 and 2 is fixed. However, it can also be replaced by an overflow of adjustable level. In this case, it may be desirable to be able to adapt the level of the upper end of the inclined plane to that of the overflow. To this end, a means for lifting the upper end of the inclined plane can be provided, for example an eccentric 25 controlled by a shaft 26.

It is obvious that the invention is not limited to the embodiments which have been described and illustrated by way of example, and there would be no departure from the scope thereof by incorporating modifications.

I claim:

1. The method of manufacturing flat glass which comprises causing glass molten in a melting furnace to flow freely from the latter in the form of a sheet, guiding such sheet of molten glass down an inclined path to the surface of a bath of molten metal, and at the end of such inclined path depositing and floating such sheet of molten glass on the surface of the molten metal bath, supplying heat to the sheet of molten glass throughout its entire path from the place of its formation at the melting furnace to the place at which it starts to float on the surface of the molten metal bath at a substantially constant temperature and in such manner that the formation of temperature gradients tending to produce a non-homogeneous flow of the glass is prevented during the movement of the sheet through such path, and supporting such sheet of molten glass throughout its entire path from the place of its formation at the melting furnace to the place at which it starts to float on the surface of the molten metal bath.

2. The method defined in claim 1, including the step of maintaining the sheet of molten glass at substantially constant thickness and width throughout its entire path from the place of its formation at the melting furnace to the place at which it starts to float on the surface of the molten metal bath.

3. Apparatus for manufacturing sheet glass, comprising a melting furnace having at its discharge end an overflow enabling the molten glass to flow freely therefrom in the form of a sheet, a bath of molten metal spaced from said furnace overflow and having its surface located below the sheet forming surface of said overflow, and inclined guide means for the sheet of molten glass providing an uninterrupted path of flow from the sheet forming surface of said overflow to the surface of the molten metal bath and having a sheet supporting surface extending through the surface of and dipping into the body of the molten metal bath, whereby the sheet of molten glass is supported throughout its entire path from the place of its formation at the furnace overflow to the place where the molten glass sheet moves from the supporting surface of said inclined guide means onto the surface of the molten metal bath.

4. Apparatus as defined in claim 3, including means for maintaining the sheet of molten glass at a constant temperature throughout its entire path from the place of its formation at said overflow to the place at which it is deposited by said inclined guide means on the surface of the molten metal bath.

5. Apparatus as defined in claim 4, in which said temperature maintaining means comprises means forming a substantially closed chamber and enclosing said furnace overflow, said inclined guide means and the part of the molten metal bath into which said inclined guide means extends, and heating means located in said enclosing means.

6. Apparatus as defined in claim 3, in which said guide means comprise an inclined plate extending from the sheet forming surface of said overflow so that it provides a molten glass sheet supporting surface forming an extension of said overflow surface, and to a point below the surface of the molten bath, and longitudinal walls extending along the sides of said inclined plate, said longitudinal walls at their upper ends extending past said overflow to a place upstream of the latter.

7. Apparatus as defined in claim 5, in which said enclosing means comprise a transverse baffle extending across the discharge end of said furnace upstream of said overflow and forming the upstream end of said chamber, and a transverse baffle extending across the molten metal bath downstream of the lower end of the sheet supporting surface of said guide means and forming the downstream end of said chamber, and in which said guide means comprises an inclined plate providing the sheet supporting surface of said guide means and extending from said overflow to a point below the surface of the molten bath, and longitudinal walls extending along the sides of said inclined plate, said longitudinal walls at their upper ends extending past said overflow to said baffle forming the upstream end of said chamber, and at their lower ends extending past the lower end of said plate to said baffle forming the downstream end of said chamber.

8. Apparatus as defined in claim 3, in which said guide means comprise an inclined plate providing the sheet supporting surface of said guide means and extending from said overflow to a point below the surface of the molten bath, longitudinally extending projections depending from the sides of said inclined plate, and a plurality of transverse bars spaced below said inclined plate and connected at their ends to said projections.

9. Apparatus as defined in claim 8, in which said guide means further include transverse extension means carried by said longitudinally extending projections and operable to place said inclined plate under transverse stress.

10. Apparatus as defined in claim 3, in which said guide means comprise an inclined plate providing the sheet supporting surface of said guide means and extending from said overflow to a point below the surface of the molten bath, means supporting said inclined plate intermediate the ends thereof, and means at the upper end of said inclined plate for varying the angle of inclination of said plate relative to said supporting means.

References Cited by the Examiner

UNITED STATES PATENTS

| | | | |
|---|---|---|---|
| 2,928,212 | 3/1960 | Long | 65—374 X |
| 2,968,892 | 1/1961 | Pilkington | 65—65 |

FOREIGN PATENTS 1,231,129   4/1960   France.

DONALL H. SYLVESTER, *Primary Examiner.*
A. D. KELLOGG, *Assistant Examiner.*